United States Patent
Lin

(10) Patent No.: US 8,103,150 B2
(45) Date of Patent: Jan. 24, 2012

(54) SYSTEM AND METHOD FOR VIDEO EDITING BASED ON SEMANTIC DATA

(75) Inventor: Borching Lin, Sindian (TW)

(73) Assignee: Cyberlink Corp., Shindian, Taipaei (TW)

( * ) Notice: Subject to any disclaimer, the term of this patent is extended or adjusted under 35 U.S.C. 154(b) by 1265 days.

(21) Appl. No.: 11/759,388

(22) Filed: Jun. 7, 2007

(65) Prior Publication Data

US 2008/0304806 A1    Dec. 11, 2008

(51) Int. Cl.
*H04N 5/93* (2006.01)
*G11B 27/00* (2006.01)
*G06F 3/00* (2006.01)
*H04N 7/18* (2006.01)

(52) U.S. Cl. ........ 386/278; 386/723; 715/704; 715/723; 348/157

(58) Field of Classification Search .................. 386/278, 386/280, 285; 348/157; 715/704, 723
See application file for complete search history.

(56) References Cited

U.S. PATENT DOCUMENTS

| | | | |
|---|---|---|---|
| 6,029,194 A | 2/2000 | Tilt | |
| 6,166,731 A | 12/2000 | Duvall et al. | |
| 6,735,253 B1 | 5/2004 | Chang et al. | |
| 2002/0069218 A1 | 6/2002 | Sull et al. | |
| 2003/0182282 A1* | 9/2003 | Ripley | 707/5 |
| 2004/0027369 A1 | 2/2004 | Kellock et al. | |
| 2005/0058430 A1 | 3/2005 | Nakamura et al. | |
| 2007/0198111 A1* | 8/2007 | Oetzel et al. | 700/94 |

FOREIGN PATENT DOCUMENTS

WO    WO 2005076594 A1 *   8/2005
* cited by examiner

*Primary Examiner* — Thai Tran
*Assistant Examiner* — Daquan Zhao
(74) *Attorney, Agent, or Firm* — Thomas, Kayden, Horstemeyer & Risley, LLP

(57) ABSTRACT

Systems and methods for video editing are described. At least one embodiment includes a method for editing a video comprising: extracting semantic data from the video, searching the extracted semantic data to identify characteristics that match a pre-defined set of characteristics, identifying a pre-defined event based on the matched characteristics within the semantic data, assigning a matching degree value to the event, assigning a theme relevancy value to the event, and automatically editing the event based on the identified event, the assigned matching degree value, and the theme relevancy value.

22 Claims, 5 Drawing Sheets

SYSTEM AND METHOD FOR VIDEO EDITING BASED ON SEMANTIC DATA

TECHNICAL FIELD

The present disclosure generally relates to editing of video content.

BACKGROUND

As the popularity of digital video continues to grow, more and more individuals have access to video content through personal computers and electronic media devices. In many instances, viewers simply generate their own video content. Digital capture devices, such as those using the DV (digital video) standard, are now affordable for many consumers. However, many consumers have come to find that while it may be interesting and sometimes even entertaining to capture video, it may be frustrating and very time-consuming to edit the video to produce a more professional feel for viewing purposes.

As an illustration, a family home movie may be recorded using a personal video recorder and then transferred to a personal computer for processing, editing, or long-term storage. Digital recorders conveniently record audio, video, and other content in digital form, such as on tape, computer memory, or a mass storage medium. The multimedia content may then be transferred to a personal computer using any number of interfaces, and then stored as a digital stream such as multimedia file in a number of common formats such as MPEG-1 or MPEG-2, for example. However, in many cases, the video content in a home movie may require editing in order to produce a more polished look and feel to the viewer. The viewer may simply desire a more professional look before sharing the video with friends and family. Use of professional video editing services may not be a feasible alternative in many instances due to cost. Furthermore, traditional off-the-shelf video editing solutions are proving to fall short in meeting the needs of consumers. One common problem with traditional video editing solutions is the degree of complexity associated with the overall editing process. While a number of products (e.g., Muvee's AutoProducer™) are available that may offer some degree of automated video editing, these products still depend on some degree of interaction (e.g., decision-making) on the part of the consumer. Thus, these products still suffer from the same apparent shortcomings as traditional video editing solutions and still require some interaction on the part of the consumer. In many instances, this process can be both time-consuming and complicated for the consumer.

SUMMARY

Briefly described, one embodiment, among others, includes a method for editing a video comprising: extracting semantic data from the video, searching the extracted semantic data to identify characteristics that match a pre-defined set of characteristics, identifying a pre-defined event based on the matched characteristics within the semantic data, assigning a matching degree value to the event, assigning a theme relevancy value to the event, and automatically editing the event based on the identified event, the assigned matching degree value, and the theme relevancy value.

Another embodiment includes a system for editing a video comprising: a module configured to extract semantic data from the video, a module configured to search the extracted semantic data to identify characteristics that match a set of pre-defined characteristics, and a module configured to identify a pre-defined event based on the matched characteristics within the semantic data.

Yet another embodiment includes a computer readable medium having a computer program for editing a video comprising: logic configured to extract semantic data from the video, logic configured to search the extracted semantic data to identify characteristics that match a set of pre-defined characteristics, logic configured to identify a pre-defined event based on the matched characteristics, logic configured to assign a matching degree value to the event, logic configured to assign a theme relevancy value to the event, and logic configured to automatically edit the event based on the identified event, the assigned matching degree value, and the theme relevancy value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a systems and methods for automatically editing video based on its semantic data and the underlying methods can be better understood with reference to the following drawings. The components in the drawings are not necessarily to scale, emphasis instead being placed upon clearly illustrating the principles of video editing. Moreover, in the drawings, like reference numerals designate corresponding parts throughout the several views.

DETAILED DESCRIPTION

Figure 1:
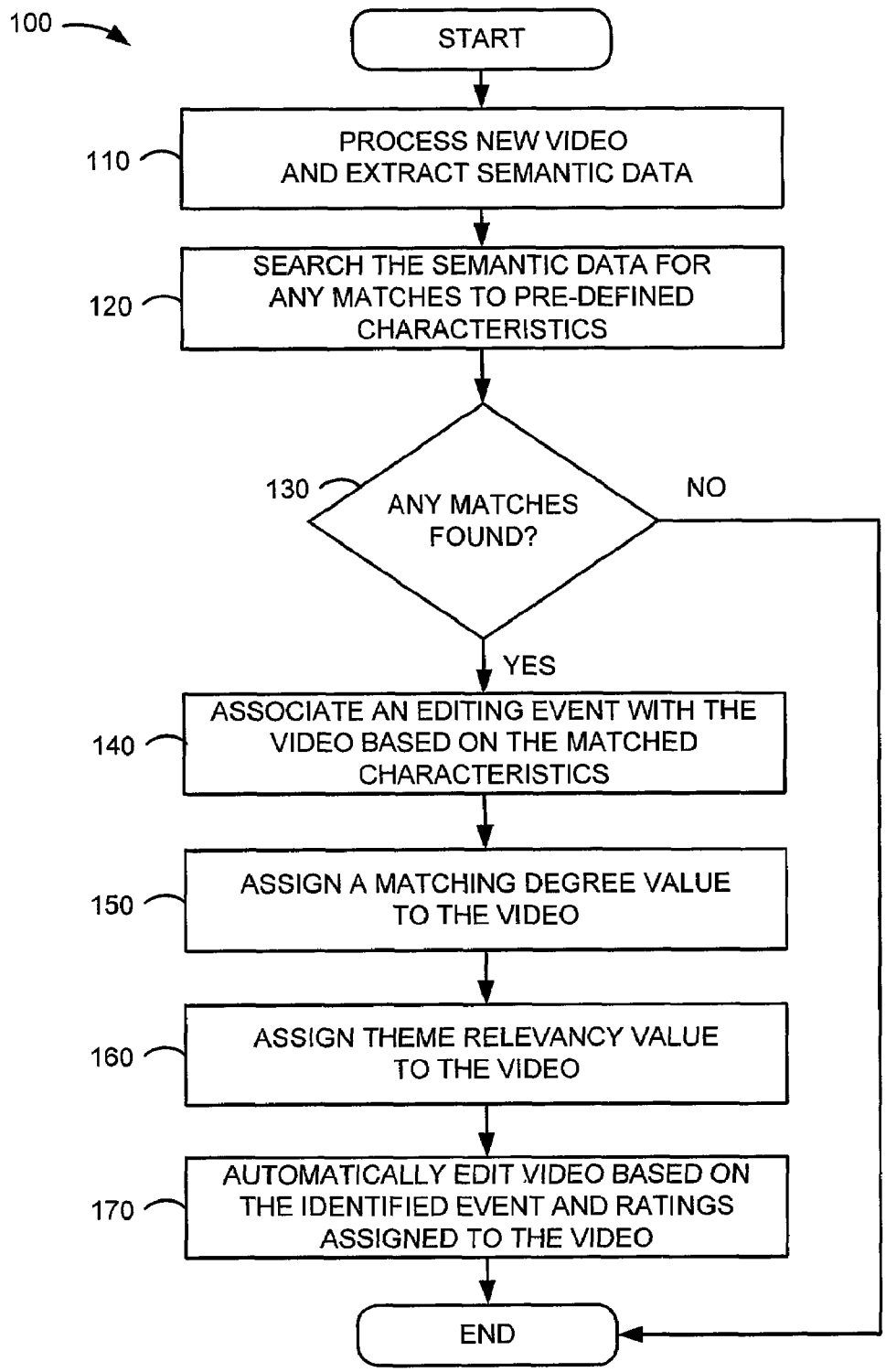
FIG. 1 depicts a top-level flow diagram for an embodiment of a method for video editing.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Embodiments of systems and methods for editing of video based on semantic data are described. It should be appreciated from the description that "automated" video editing refers to video editing having a certain level of automation. Semantic data generally refers to any meaningful data found in the video. Some examples include the identification of candle lights in the video or the presence of a particular song (e.g., birthday song) within the audio portion of the video. Other examples include the presence of many individuals (i.e., a crowd) within the video or the presence of camera flashes.

These are just some examples of meaningful data found within videos which is useful for editing purposes.

In accordance with certain aspects of a method for automated video editing based on semantic video, FIG. 1 depicts a top-level flow diagram for one embodiment of a method for video editing. Starting with step 110, a new video is processed and semantic data related to the video is extracted for later use. It should be noted that the video content may be in any of a number of formats including, but not limited to, MPEG-1, MPEG-2, MPEG-4, H.264, 3GPP, 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, AVI, digital video (DV), QuickTime (QT) file, Windows Media Audio (WMA), Windows Media Video (WMV), Advanced System Format (ASF), or any number of other popular digital multimedia formats. The above exemplary formats are merely examples, and it is intended that the various embodiments of systems and methods for automated video editing cover any type of multimedia content in its broadest sense.

Next in step 120, the semantic data extracted in step 110 is searched for any attributes that match a pre-defined set of characteristics. In some embodiments, the semantic data may be searched or extracted using some type of algorithm, which may identify key features within the video. The purpose of this step is to determine whether a particular event is taking place within the video. After semantic data is extracted, the semantic data is compared against an archive of pre-defined events. These events are defined by certain characteristics. For example, a wedding event might be defined by the following characteristics; the presence of a large number of individuals, lit candles, a woman in a white wedding gown, and a man dressed in black and white. As another example, a birthday party event might be defined by the following characteristics: the presence of multiple individuals, a birthday cake with lit candles, and a birthday song begin sung. If all (or some) of these events were found in the semantic data, then a birthday celebration event would be associated with the video. One should note that for some embodiments, an exact match between an event (comprising certain characteristics) and the semantic data doesn't have to occur. In some cases, the semantic data will only match some of the characteristics found in the archive of events. In those instances, the event that most closely matches the semantic data is associated with the video. Later, automated editing is executed based on the identified event, the associated matching degree value, and the theme relevancy value of the video.

At decision block 130, a determination is made as to whether there are any matches between the extracted semantic data and the pre-defined set of characteristics found within the archive of events. If there are no matches (the NO condition of decision block 130), then no matching degree value and no theme relevancy value is assigned to the video. The video likely contains an event not defined by the pre-defined set of characteristics. However, if there are matches found (the YES condition of decision block 130), then an event defined by the pre-defined set of characteristics is associated with the video in step 140. For some embodiments, the video may be associated with the event through the use of tags. The tag may then later be used for automated editing. Furthermore, the tag may also be used for future processing, wherein the tag conveys that the video is already associated with a particular event and redundant processing is thereby avoided. In some embodiments, the tag may simply be integrated into the video file. In the example referenced earlier, a birthday celebration would be one example of an event that could be associated with the video.

Figure 4:
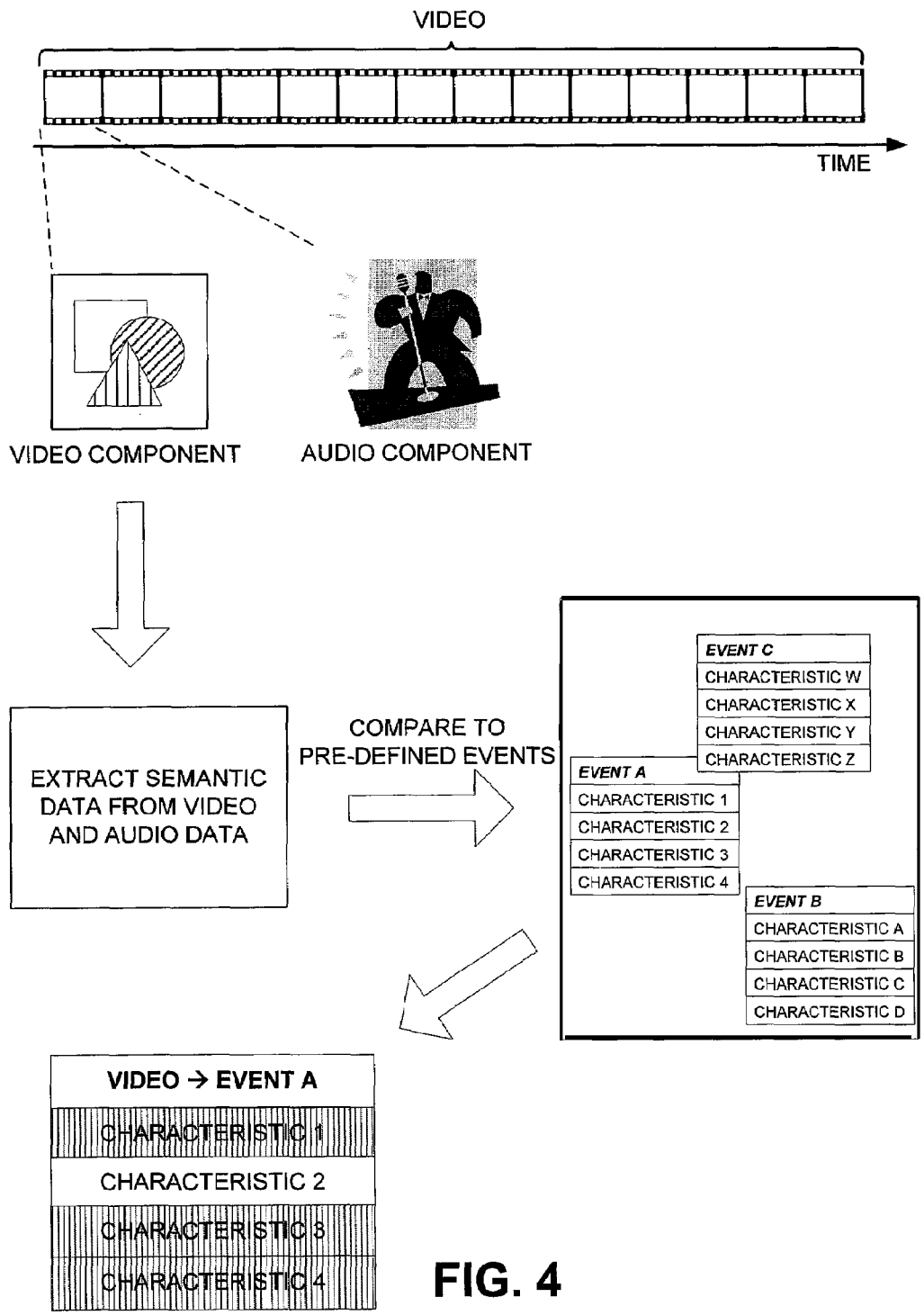
FIG. 4 illustrates the process by which semantic data is extracted and an event is identified.

Reference is now made to FIG. 4, which illustrates the process by which semantic data is extracted and an event is identified. A new video to be edited is processed on a frame by frame basis. Within each frame, the video component and audio component are analyzed for any meaningful content. This meaningful content is then extracted as semantic data associated with the video. Once semantic data is extracted from the video, it is compared against a set of pre-defined events. These events are defined by a pre-defined set of characteristics. For example, as shown in FIG. 4, Event A is defined by characteristics 1-4. Likewise, Event B is defined by characteristics A-D. In the illustration shown, the new video is identified as Event A based on matches between its semantic data and Characteristics 1, 3, and 4 as shown at the bottom of FIG. 4.

Figure 5:
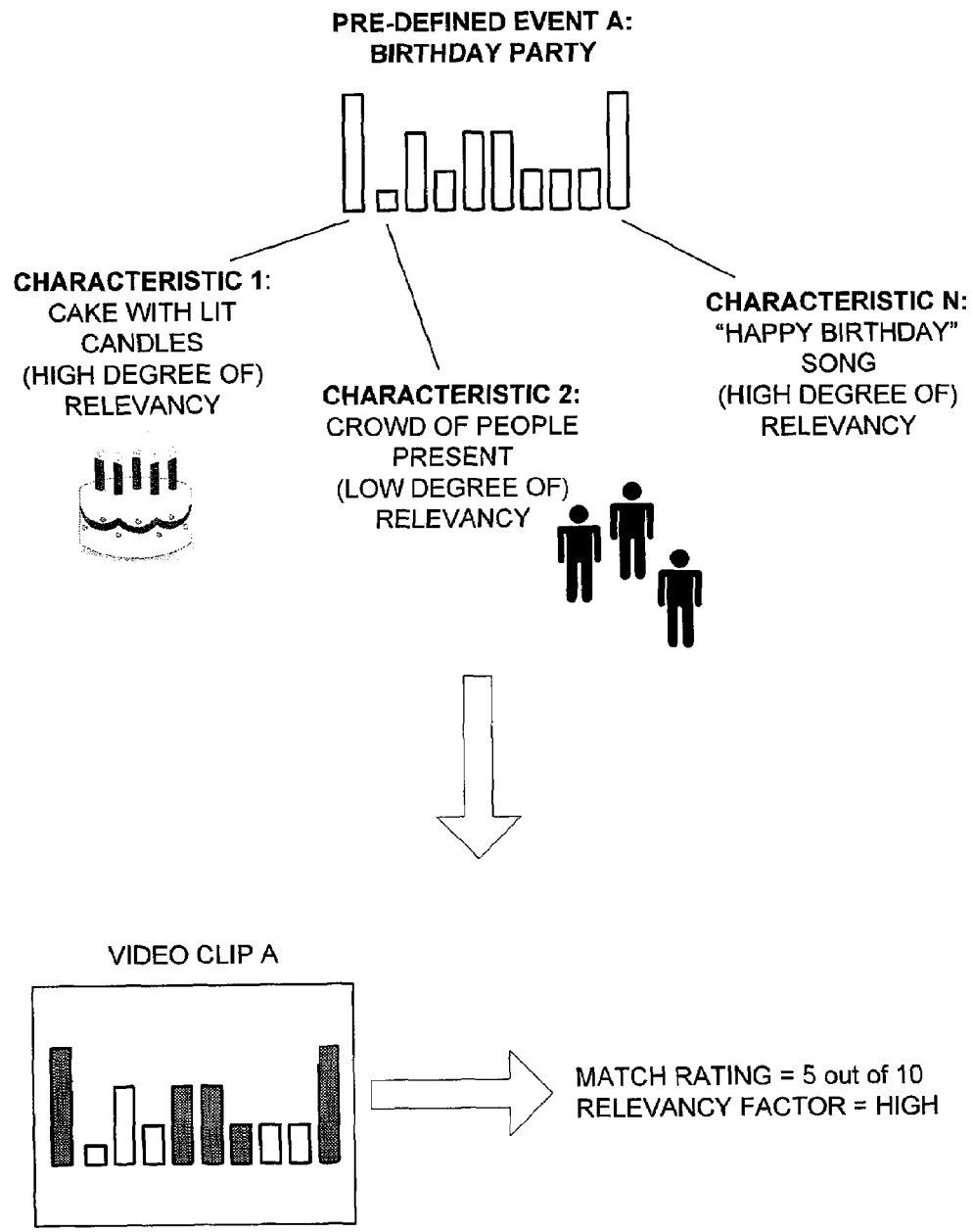
FIG. 5 illustrates the concept of the degree of relevancy and the matching degree ratings.

Referring back to FIG. 1, in steps 150 and 160, a matching degree value and a theme relevancy value is assigned to the video after an event is associated with the video. In some embodiments, the use of tags may again be incorporated in order to associate a video with a matching degree value and a theme relevancy value. The matching degree value reflects the number of attributes within the semantic data of the video which drew a match to some of the pre-defined characteristics. The theme relevancy value reflects the total of all the individual relevancy scores. Reference is now made to FIG. 5, which illustrates the concept of the degree of relevancy and the matching degree ratings. The birthday example referenced earlier is used in the illustration. Suppose a birthday celebration event, shown as Event A in FIG. 5, is pre-defined such that the following characteristics are searched: the presence of a cake with lit candles (characteristic 1), a crowd of people (characteristic 2), and the presence of a birthday song in the audio portion of the video (characteristic N). For some embodiments, the matching degree value reflects the number of matches found in the semantic data with respect to the event associated with the video. For example, if only three matches were found in the birthday example of FIG. 5, then the matching degree value would be (3/N), where N is the total number of characteristics which define the event (Event A).

A theme relevancy value is used because different attributes will have varying degrees of relevancy. This will ultimately help determine which editing effect is implemented into the video. Some attributes might be considered to be more generic in nature, whereas other attributes tend to be very specific to a particular event. Referring back to the illustration in FIG. 5, a crowd of people would be considered a fairly generic attribute. While a birthday celebration will typically involve a crowd of people, a crowd of people might be present in various other events such as a baseball game, a piano recital, or a simple lunch gathering. Given the fairly generic nature of this attribute (i.e., presence of a crowd of individuals), a relatively low relevancy theme rating would be assigned to this characteristic. For some embodiments, the theme relevancy rating may be implemented on a simple scale comprising a "LOW" relevancy rating, a "MEDIUM" relevancy rating, and a "HIGH" relevancy rating. For alternative embodiments, the theme relevancy value may be a numeric value based on a pre-determined scale. Referring back to FIG. 5, the presence of a crowd of people is assigned a theme relevancy value of "LOW." In contrast, the cake with candles lit is assigned a theme relevancy value of "HIGH" as this characteristic is much more specific to a birthday celebration event. Likewise, a birthday song being sung is assigned a theme relevancy value of "HIGH."

Figure 6:
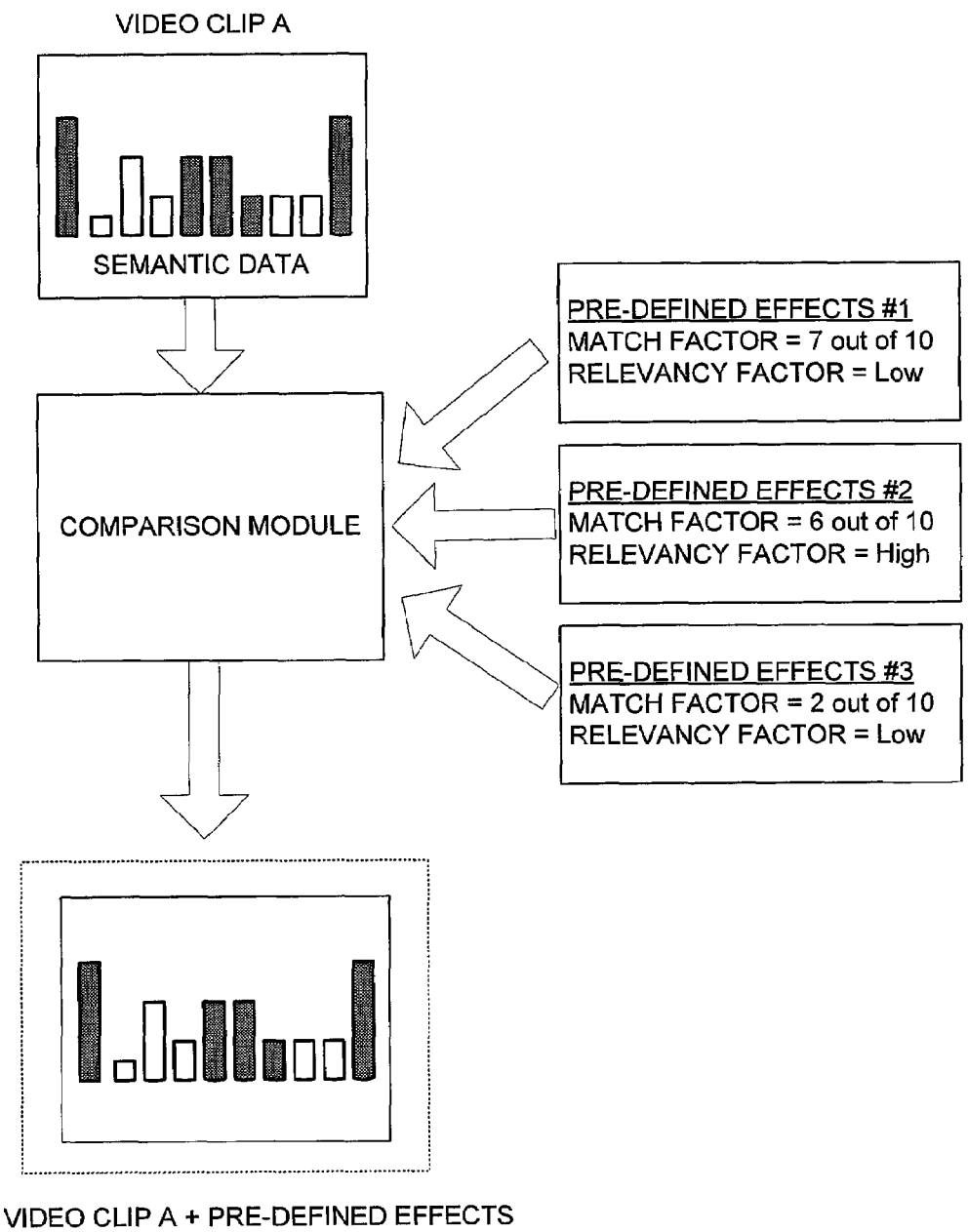
FIG. 6 illustrates automated selection of a Pre-Defined Effect which is implemented into the video.

Next, in step 170, the automated editing of the video is performed based on the identified event, the matching degree value, and the theme relevancy value assigned to the video. The ratings are utilized even though a particular event was already associated with the video back in step 140 because different effects may be implemented for a given event. Reference is now made to FIG. 6, which illustrates automated selection of a pre-defined effect which is implemented into a video. Different pre-defined effects are shown. In this particular illustration, if "Video Clip A" was assigned a match rating of 7 out of 10 and a theme relevancy value of "LOW," then Pre-Defined Effects #1 would be incorporated into the video. On the other hand, if "Video Clip A" has a match rating of 6 out of 10 and a theme relevancy value of "HIGH," then Pre-Defined Effects #2 would be implemented. Likewise, a match rating of 2 out of 10 and a theme relevancy value of "LOW" would result in Pre-Defined Effects #3 being implemented. Suppose that "Video Clip A" is determined to be a birthday celebration event. However, suppose also that "Video Clip A" only was assigned a match factor of 2 out of 10 and a low theme relevancy rating. This might be the case if only a crowd of individuals and the presence of a cake (without lit candles) were detected in the semantic data. The theme relevancy rating would be understandably low as these would be considered generic events. For instance, a retirement celebration or a graduation party could include those same attributes (i.e., a crowd of individuals and a cake). Hence, a more generic special effect (i.e., Pre-Defined Effect #3) is implemented into the video, such as a picture-in-picture (PiP) effect comprising a colored ribbon frame surrounding the video or a text title overlaid on top of the video saying "Congratulations!". On the other hand, a high match rating and a high theme relevancy value would mean that there's a higher likelihood that a birthday celebration is taking place within the video. Hence, a more specific special effect (i.e., Pre-Defined Effect #1) might be implemented such as text and streamers scrolling across the screen saying "Happy Birthday!" or birthday cake icons floating around on the screen. One should note that for some embodiments, multiple events may be identified across the timeline of a given video. Based on the matching degree and theme relevancy values, some of the editing events may be given lower priority because of their lower values. In order to avoid overloading the video with too many special effects, special effects associated with high matching degree and theme relevancy values are given priority and implemented first. If too many events are identified within the video, the events with lower scores are simply disregarded (i.e., a special effect is not implemented for that event).

Figure 2:
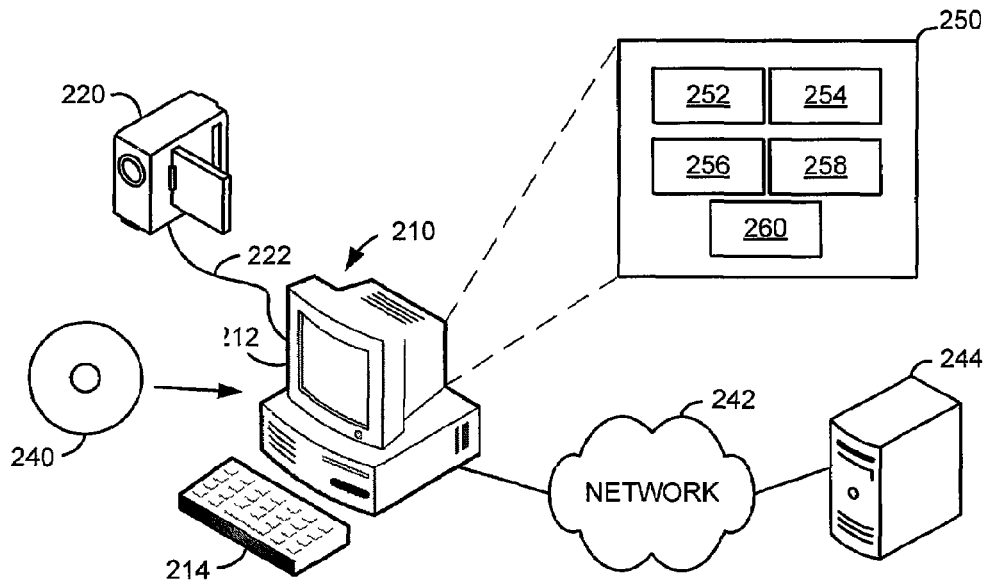
FIG. 2 depicts an embodiment of a system for video editing.

In accordance with certain aspects of automated editing, FIG. 2 depicts an embodiment of a system for video editing. The system includes an editing station 210 having a display 212 and a user input device 214, which, for example, may be a keyboard or a mouse. The editing station 210 may be any type of computer system such as personal computer or a laptop, for example.

The video content to be edited by the editing system 210 can come from any number of other sources, including a video camera 220, an optical disk 240 or a network 242. A video camera 220 may be coupled to editing system 210 via an electrical cable 222 or a wireless connection. Video camera 220 may, for example, be a digital camcorder which records multimedia content in a variety of digital formats. In this embodiment, electrical cable 222 may be any number of common computer interface cables, such as, but not limited to IEEE-1394 High Performance Serial Bus (Firewire), Universal Serial Bus (USB), a serial connection, or a parallel connection. In this embodiment, a digital multimedia stream may be transferred from the video camera 220 to the editing system 210 over electrical cable 222. It should be understood that the systems and methods for automated editing of video do not require the step of providing the video content.

Editing system 210 may form a node on a network 242. In this configuration, video content to be edited may be delivered from a remote server 244 over network 242 to the editing system 214. The connection between the remote server 244 and editing system 214 may be any number of standard networking interfaces such as a CAT-5, Firewire, or wireless connection, for example.

Editing system 210 includes a memory 250, which may be used to store a number of executable modules therein. In some embodiments, any of a semantic data extractor 252, a semantic data analyzer 254, a matching degree rating module 256, a theme relevancy rating module 258, and an editing module 260 may be stored therein. In some embodiments, these modules may be stored in memory 250 along with other executable modules.

In general, the semantic data extractor 252 processes a new video and extracts semantic data from the content. Semantic data generally refers to any meaningful attributes associated with the video. Some examples of semantic data include, but are not limited to, the identification of a cake with lit candles in the video, a birthday song being detected in the audio portion of the video, and the identification of a crowd of people. The semantic data extractor 252 then passes the derived semantic data to the semantic data analyzer 254.

The semantic data analyzer 254 takes the semantic data that was extracted from the new video and then searches the semantic data to identify characteristics that match a set of pre-defined characteristics. Based on the number of matches, the semantic data analyzer 254 then attempts to determine what event is taking place within the video. The semantic data analyzer 254 accomplishes this by comparing the semantic data associated with the video with a series of events pre-defined by certain characteristics. For example, one pre-defined event might be a wedding ceremony. The wedding ceremony event could be defined by the following characteristics: the presence of a large number of people, lit candles, woman in a white wedding gown, and a man dressed in black and white. Another example would be a birthday party celebration. This event could be defined by the following characteristics: the presence of a crowd of people, a cake with lit candles, a birthday song being sung in the audio portion of the video, and panning/zooming motion by the camera. The semantic data analyzer 254 compares the extracted semantic data against all the characteristics (crowd of people, a cake with lit candles, etc.) and based on the number of matches, determines what kind of event is taking placing within the video. In some embodiments, these pre-defined events are stored in a database accessible by the semantic data analyzer 254.

The matching degree rating module 256 performs the function of assigning a matching degree rating to the video. The matching degree value reflects the number of attributes within the semantic data which matched characteristics found within the various pre-defined events. Briefly referring back to FIG. 5, in some embodiments if only three matches were found in the birthday example illustrated, then the matching degree value would be (3/N), where N is the total number of characteristics which define the event (Event A). In this case, the matching degree rating module 256 would assign a value of (3/N) to the video. The matching degree module 256 then forwards the matching degree value to the editing module 260. This matching degree value (along with the theme relevancy value) is used later to how determine which special effect to incorporate into the video.

The theme relevancy rating module 258 performs the function of assigning a theme relevancy rating to the video. The theme relevancy value, again, reflects the total relevancy score made up of individual relevancy scores. A theme relevancy value is used because different attributes will have differing degrees of relevancy. This will ultimately affect which editing effect is implemented into the video. Some attributes might be considered to be more generic in nature, whereas other attributes tend to be very specific to a particular event. Referring back to the illustration in FIG. 5, a crowd of people would be considered a fairly generic attribute. While a birthday celebration will typically involve a crowd of people, a crowd of people might be present in a variety of other events such as a baseball game, a piano recital, or a simple lunch gathering. Given the fairly generic nature of this attribute (i.e., presence of a crowd of individuals), a relatively low relevancy theme rating would be assigned to this characteristic.

In some embodiments, the theme relevancy rating module 258 will assign a theme relevancy rating based on a simple scale comprising a "LOW" relevancy rating, a "MEDIUM" relevancy rating, and a "HIGH" relevancy rating. In alternative embodiments, the theme relevancy rating module 258 will assign a theme relevancy value comprised of a numeric value based on a pre-determined scale. The theme relevancy rating module 258 then forwards the theme relevancy value to the editing module 260.

The editing module 260 then takes into consideration the identified event, the matching degree value, and the theme relevancy value now associated with the video and automatically determines which special effect or style to incorporate into the video. Thus, the viewer doesn't have to make any editing decisions since the video editing process is automated. The matching degree value and the theme relevancy value are utilized even though a particular event was already associated with the video by the semantic data analyzer 254 because different effects may be implemented for a given event.

Referring back briefly to FIG. 6, different pre-defined effects are shown: Pre-Defined Effects #1, Pre-Defined Effects #2, and Pre-Defined Effects #3. Again, in this particular illustration, if "Video Clip A" has a match rating of 7 out of 10 and a theme relevancy value of "LOW," then Pre-Defined Effects #1 would be implemented into the video. On the other hand, if "Video Clip A" has a match rating of 6 out of 10 and a theme relevancy value of "HIGH," then Pre-Defined Effects #2 would be implemented. Likewise, a match rating of 2 out of 10 and a theme relevancy value of "LOW" would result in Pre-Defined Effects #3 being implemented. Suppose that "Video Clip A" is determined to be a birthday celebration event. However, suppose also that "Video Clip A" only was assigned a match factor of 2 out of 10 and a low theme relevancy rating. This might be the case if only a crowd of individuals and the presence of a cake (without lit candles) were detected in the semantic data. The theme relevancy rating would be understandably low as these could be considered generic events. For instance, a retirement celebration or a graduation party could include those attributes (a crowd of individuals and a cake). Hence, a more generic special effect (i.e., Pre-Defined Effect #3) might be implemented such as a PiP effect comprising a colored ribbon frame surrounding the video. On the other hand, a high match rating and a high theme relevancy value would mean there's a higher likelihood that a birthday celebration is taking place within the video. Hence, a more specific special effect (i.e., Pre-Defined Effect #1) might be implemented such as text and streamers moving across the screen saying "Happy Birthday!" or birthday cake icons floating around on the screen.

Each of the executable modules, such as the semantic data extractor 252, the semantic data analyzer 254, the matching degree rating module 256, the theme relevancy rating module 258, and the editing module 260, and any sub-modules may comprise an ordered listing of executable instructions for implementing logical functions. When the executable modules are implemented in software, it should be noted that the system can be stored on any computer-readable medium for use by, or in connection with, any computer-related system or method. In the context of this document, a computer-readable medium is an electronic, magnetic, optical, or other physical device or apparatus that can contain or store a computer program for use by or in connection with a computer-related system or method. The executable modules can be embodied in any computer-readable medium for use by, or in connection with, an instruction execution system, apparatus, or device, such as a computer-based system, processor-containing system, or other system that can fetch the instructions from the instruction execution system, apparatus, or device and execute the instructions.

In the context of this document, a "computer-readable medium" can be essentially anything that can store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

Figure 3:
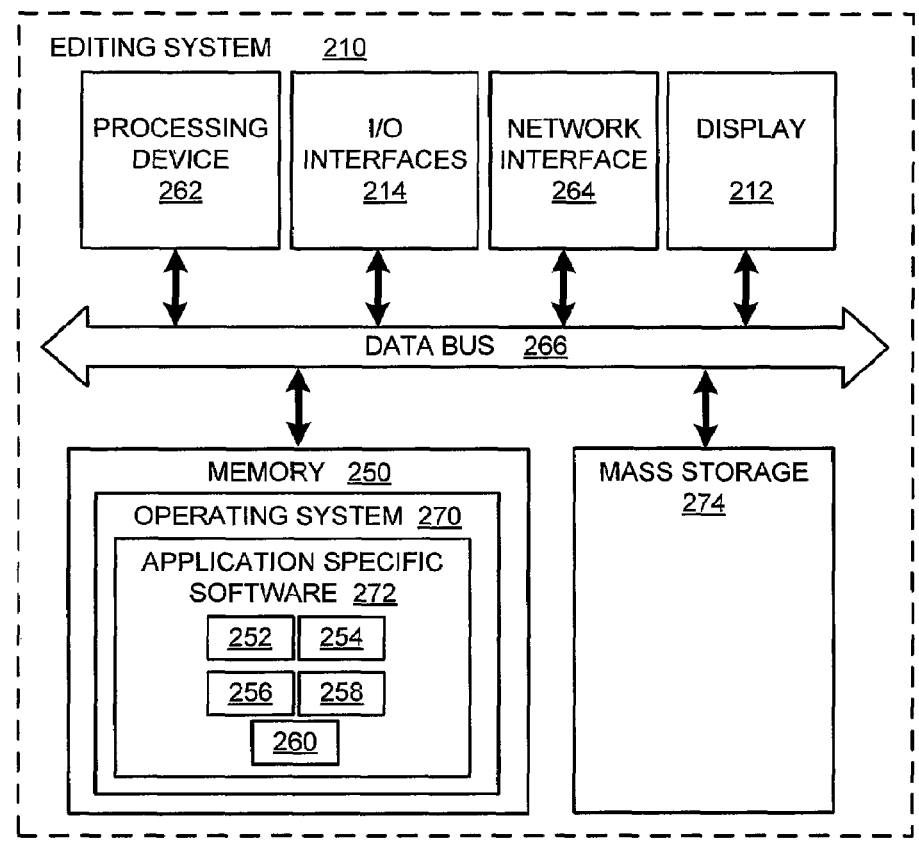
FIG. 3 depicts a block diagram for an embodiment of a computer system of FIG. 2.

FIG. 3 is a block diagram illustrating an exemplary embodiment of the editing system 210 on which semantic data extractor 252, the semantic data analyzer 254, the matching degree rating module 256, the theme relevancy rating module 258, and the editing module 260 may be executed. Generally speaking, the editing system 210 can comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. Irrespective of its specific arrangement, editing system 210 can, for instance, comprise memory 250, a processing device 262, a number of input/output interfaces 214, a network interface 264, a display 212, and mass storage 274, wherein each of these devices are connected across a data bus 266.

Processing device 262 can include any custom made or commercially available processor, a central processing unit (CPU) or an auxiliary processor among several processors associated with the editing system 210, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 250 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 250 typically comprises a native operating system 270, one or more native applications, emulation systems, or emulated applications for any of a variety of operating systems and/or emulated hardware platforms, emulated operating systems, etc. For example, the applications may include application specific software 272, which may include any of the semantic data extractor 252, the semantic data analyzer 254, the matching degree rating module 256, the theme relevancy rating module 258, and the editing module 260. One of ordinary skill in the art will appreciate that memory 250 can, and typically will, comprise other components which have been omitted for purposes of brevity.

Input/output interfaces 214 provide any number of interfaces for the input and output of data. For example, where the editing system 210 comprises a personal computer, these components may interface with user input device 214, which may be a keyboard or a mouse. Where the editing system 210 comprises a handheld device (e.g., PDA, mobile telephone), these components may interface with function keys or buttons, a touch sensitive screen, a stylist, etc. Display 212 can comprise a computer monitor or a plasma screen for a PC or a liquid crystal display (LCD) on a hand held device, for example.

With further reference to FIG. 3, network interface device 264 comprises various components used to transmit and/or receive data over network 242. By way of example, the network interface 264 may include a device that can communicate with both inputs and outputs, for instance, a modulator/demodulator (e.g., a modem), wireless (e.g., radio frequency (RF)) transceiver, a telephonic interface, a bridge, a router, network card, etc.).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A system for editing a video comprising:
a module configured to extract semantic data from the video;
a module configured to search the extracted semantic data to identify characteristics that match a set of pre-defined characteristics; and
a module configured to identify a pre-defined event based on the matched characteristics within the semantic data;
a module configured to assign a matching degree value to the event;
a module configured to assign a theme relevancy value to the event; and
a module configured to automatically edit the video based on the identified event, the assigned matching degree value, and the theme relevancy value.

2. The system of claim 1, wherein editing the event comprises incorporating a special effect or style into the video.

3. The system of claim 1, wherein the matching degree value signifies the extent to which characteristics within the semantic data matches the pre-defined set of characteristics for a particular event.

4. The system of claim 1, wherein the theme relevancy value signifies the total degree of relevancy of all the matched characteristics within the semantic data.

5. The system of claim 1, wherein the pre-defined events comprise a set of pre-defined characteristics.

6. The system of claim 1, wherein the pre-defined characteristics are grouped into separate events.

7. The system of claim 1, wherein the matching degree value is based on the number of matches found between the semantic data and the pre-defined characteristics associated with the event identified in the video.

8. The system of claim 4, wherein the theme relevancy value is based on a total value of individual theme relevancy values.

9. The system of claim 4, wherein the theme relevancy value is comprised of one of the following values: low, medium, and high.

10. The system of claim 4, wherein the theme relevancy value is a numeric value based a pre-determined scale.

11. A method for editing a video comprising:
extracting semantic data from the video;
searching the extracted semantic data to identify characteristics that match a pre-defined set of characteristics; and
identifying a pre-defined event based on the matched characteristics within the semantic data;
assigning a matching degree value to the event;
assigning a theme relevancy value to the event; and
automatically editing the video based on the identified event, the assigned matching degree value, and the theme relevancy value.

12. The method of claim 11, wherein editing the event comprises incorporating a special effect or style into the video.

13. The method of claim 11, wherein the matching degree value signifies the extent to which characteristics within the semantic data matches the pre-defined set of characteristics.

14. The method of claim 11, wherein the theme relevancy value signifies the total degree of relevancy of all the matched characteristics within the semantic data.

15. The method of claim 11, wherein the pre-defined events comprise a set of pre-defined characteristics.

16. The method of claim 11, wherein the pre-defined characteristics are grouped into separate events.

17. The method of claim 11, wherein the matching degree value is based on the number of matches found between the semantic data and the pre-defined characteristics associated with the event identified in the video.

18. The method of claim 11, wherein the theme relevancy value is based on a total value of individual theme relevancy values.

19. The method of claim 18, wherein the theme relevancy value is comprised of one of the following values: low, medium, and high.

20. The method of claim 18, wherein the theme relevancy value is a numeric number based on a pre-determined scale.

21. A non-transitory computer readable medium having a computer program for editing a video comprising:
logic configured to extract semantic data from the video;
logic configured to search the extracted semantic data to identify characteristics that match a set of pre-defined characteristics;
logic configured to identify a pre-defined event based on the matched characteristics;
logic configured to assign a matching degree value to the event;

logic configured to assign a theme relevancy value to the event; and logic configured to automatically edit the video based on the identified event, the assigned matching degree value, and the theme relevancy value.

22. The non-transitory computer readable medium of claim 21, wherein editing the event comprises incorporating a special effect or style into the video.

* * * * *